United States Patent [19]

O'Brien et al.

[11] Patent Number: 5,317,875
[45] Date of Patent: Jun. 7, 1994

[54] THERMALLY-CONTROLLED ROTARY DISPLACEMENT ACTUATOR OPERABLE FOR PRECISE DISPLACEMENT OF AN OPTICAL OR MECHANICAL ELEMENT

[75] Inventors: Michael J. O'Brien; William B. Smith, both of Rochester, N.Y.

[73] Assignee: Eastman Kodak Company, Rochester, N.Y.

[21] Appl. No.: 996,427

[22] Filed: Dec. 23, 1992

[51] Int. Cl.$^5$ .................... F01B 29/10; F02G 1/04
[52] U.S. Cl. ........................ 60/527; 60/528; 359/820
[58] Field of Search ............... 60/527, 528; 359/820

[56] References Cited

U.S. PATENT DOCUMENTS

| 1,325,936 | 12/1919 | Fouasse | 359/820 |
|---|---|---|---|
| 4,525,745 | 6/1985 | Ghaem-Maghami et al. | 358/237 |
| 4,604,753 | 8/1986 | Sawai | 372/36 |
| 4,656,635 | 4/1987 | Baer et al. | 372/69 |
| 4,730,335 | 3/1988 | Clark et al. | 372/98 |
| 4,736,587 | 4/1988 | Suzuki | 60/528 |
| 4,850,674 | 7/1989 | Hasselskog | 350/253 |
| 4,861,137 | 8/1989 | Nagata | 350/253 |
| 4,932,210 | 6/1990 | Julien et al. | 60/527 |
| 4,993,801 | 2/1991 | Sarraf | 350/96 |

FOREIGN PATENT DOCUMENTS

| 2830341 | 7/1978 | Fed. Rep. of Germany | G02B 7/02 |
|---|---|---|---|
| 58-203405 | 11/1983 | Japan | G02B 7/00 |
| 1476536 | 4/1989 | U.S.S.R. | 60/527 |
| 127800 | 3/1919 | United Kingdom . | |

Primary Examiner—Ira S. Lazarus
Assistant Examiner—Sara Raab
Attorney, Agent, or Firm—Mark Z. Dudley; Thomas H. Close

[57] ABSTRACT

In a first preferred embodiment of a thermal rotary actuator constructed according to the present invention, an actuator body includes first and second spaced, parallel linear actuator elements each linear actuator element having a respective predetermined coefficient of thermal expansion (CTE) and respective first and second ends defining the linear actuator element length. The linear actuator elements, in response to a selected temperature differential therebetween, are thereby subject to a predetermined length differential. Means are provided for effecting the selected temperature differential in the first and second linear actuator elements to thereby effect the predetermined length differential. First yoke means, attached to the first ends of the first and second linear actuator elements, include fixing means for fixing the first ends in a predetermined spatial relationship, and means for flexibly attaching said fixing means to the reaction structure. Second yoke means are attached to the second ends of the first and second linear actuator elements and include means for flexibly attaching the moveable object to the second ends of the first and second linear actuator elements. The second yoke means, in response to said length differential, thereby translates the predetermined differential length to a proportional displacement of the moveable element. Second and third preferred embodiments include the addition of an auxiliary flexure system in the second yoke means.

5 Claims, 3 Drawing Sheets

FIG. 2
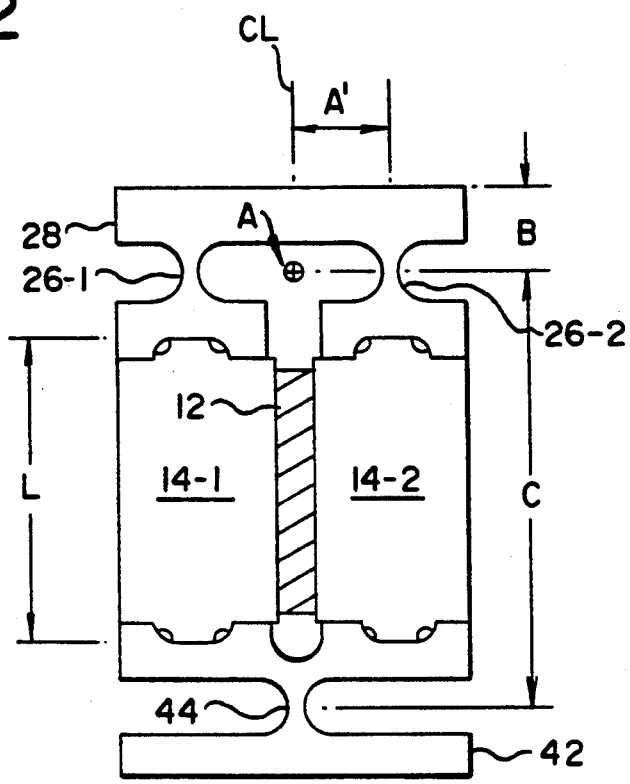
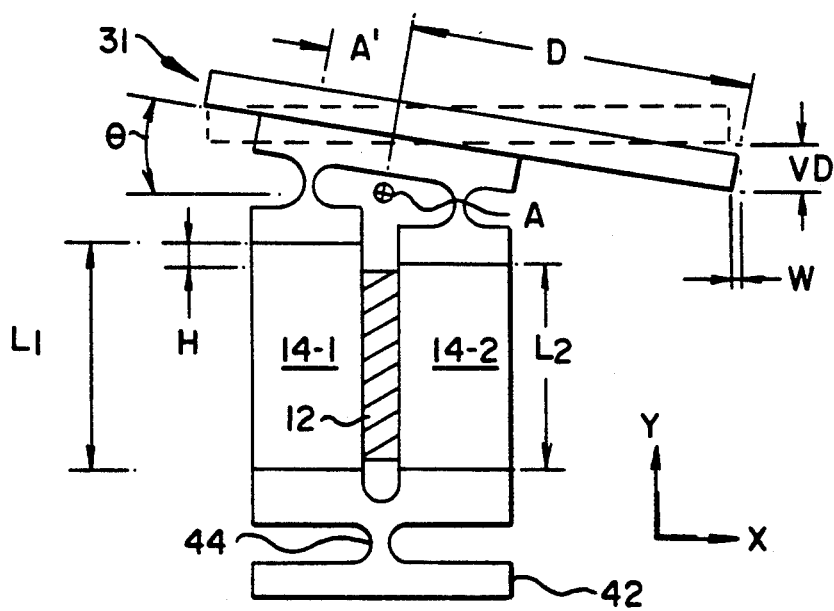
FIG. 3

THERMALLY-CONTROLLED ROTARY DISPLACEMENT ACTUATOR OPERABLE FOR PRECISE DISPLACEMENT OF AN OPTICAL OR MECHANICAL ELEMENT

BACKGROUND OF THE INVENTION

The present invention relates to displacement actuators and in particular to a thermally-activated displacement actuator useable in means for effecting temperature-compensation of, for example, the focal length of optical elements in an optical assembly.

Low-resolution, thermally-activated displacement actuators are commonly used on household appliances and automobiles as safety devices or as controllers of motion functions. A commonly-employed technique for effecting linear motion is to heat or cool a fluid confined within a cylinder having a moveable piston. The piston moves as the actuating fluid expands or contracts, as illustrated in U.S. Pat. No. 4,055,954. Control of actuator position by a temperature control based on position feedback is shown in U.S. Pat. No. 4,081,963. Another type of thermally-activated actuator employs phase changes in a force-generating medium to apply a force on a piston. The large volume difference between solid and liquid wax is disclosed in U.S. Pat. No. 5,025,627 wherein actuation is controlled via a thermoelectric cooler (TEC) based on position feedback. A volume difference in solid phases is disclosed in U.S. Pat. No. 4,553,393 wherein memory metal beams of binary weighted stiffness are resistively heated to cause a phase change, thereby creating a force proportional to the element axial stiffness. Still another type of thermally-activated actuator relies on expansion and contraction of solid members to achieve rotary motion, such as may be found in thermostats and automatic choke devices, wherein bimetallic springs produce rotary motion.

However, certain systems require precise displacement of a moveable mechanical or optical element to effect or maintain the accuracy or resolution of the system. For example, in a high-resolution optical imaging system, such as may be found in a laser output scanner, a stable, monochromatic collimated light beam must be provided by a beam source that typically includes a laser diode and a collimating lens. For adequate optical performance, the beam source must maintain a predetermined beam quality over a wide ambient temperature range. In conventional approaches, the laser diode and lens are mounted in a mechanical structure that attempts to maintain the beam focal length while the apparatus undergoes ambient temperature-induced structural changes. The thermal compensation of the beam focal length is typically effected either passively or actively.

Passive compensation systems rely on the differences in coefficients of thermal expansions of the various elements in the optical system such that there is a mechanical movement to minimize the net focus shift over a narrow ambient temperature range. One such conventional approach is to employ concentric tube systems, which, if constructed from common materials, are too large or bulky. For example, U.S. Pat. No. 4,730,335 discloses a series of interlocking tubes each carrying a single optical element of an optically-pumped solid-state laser. Such an apparatus can compensate only for a relatively narrow range of ambient temperature changes, and is too large to be suitable for many applications.

Conventional active compensation systems (wherein, for example, heating elements or thermoelectric coolers are used) have other disadvantages. For example, a thermoelectric cooler is employed in the apparatus disclosed in U.S. Pat. No. 4,604,753 to stabilize the output power and wavelength of a laser diode beam source; U.S. Pat. Nos. 4,656,635 and 4,993,801 disclose a beam source wherein a thermoelectric cooler is employed to control the operating temperature of the entire head. These apparatus are more complex and expensive to construct, and offer less accurate displacement, than is desired for certain applications, including the aforementioned laser output scanner application.

SUMMARY OF THE INVENTION

The present invention provides method and apparatus for precise positioning of a moveable element such as an optical or mechanical element or the like, and includes first and second linear actuator elements and means for controlling the temperature difference between the two linear actuator elements to achieve a desired difference in element length. This selectable change in linear actuator element lengths is translated into a displacement of the moveable object by means of first and second yoke means.

The invention, its objects, and advantages, will become more apparent in the detailed description of the preferred embodiments presented below.

BRIEF DESCRIPTION OF THE DRAWINGS

FIG. 2 is a side sectional view of the assembly of FIG. 1.

FIGS. 3 and 4 are side sectional views of the assembly of FIG. 1, showing an operation that effects a selectable displacement of a moveable element.

FIGS. 4 and 5 are side sectional views of alternative embodiments of the assembly of FIG. 1.

DETAILED DESCRIPTION OF THE PREFERRED EMBODIMENTS

Figure 1:
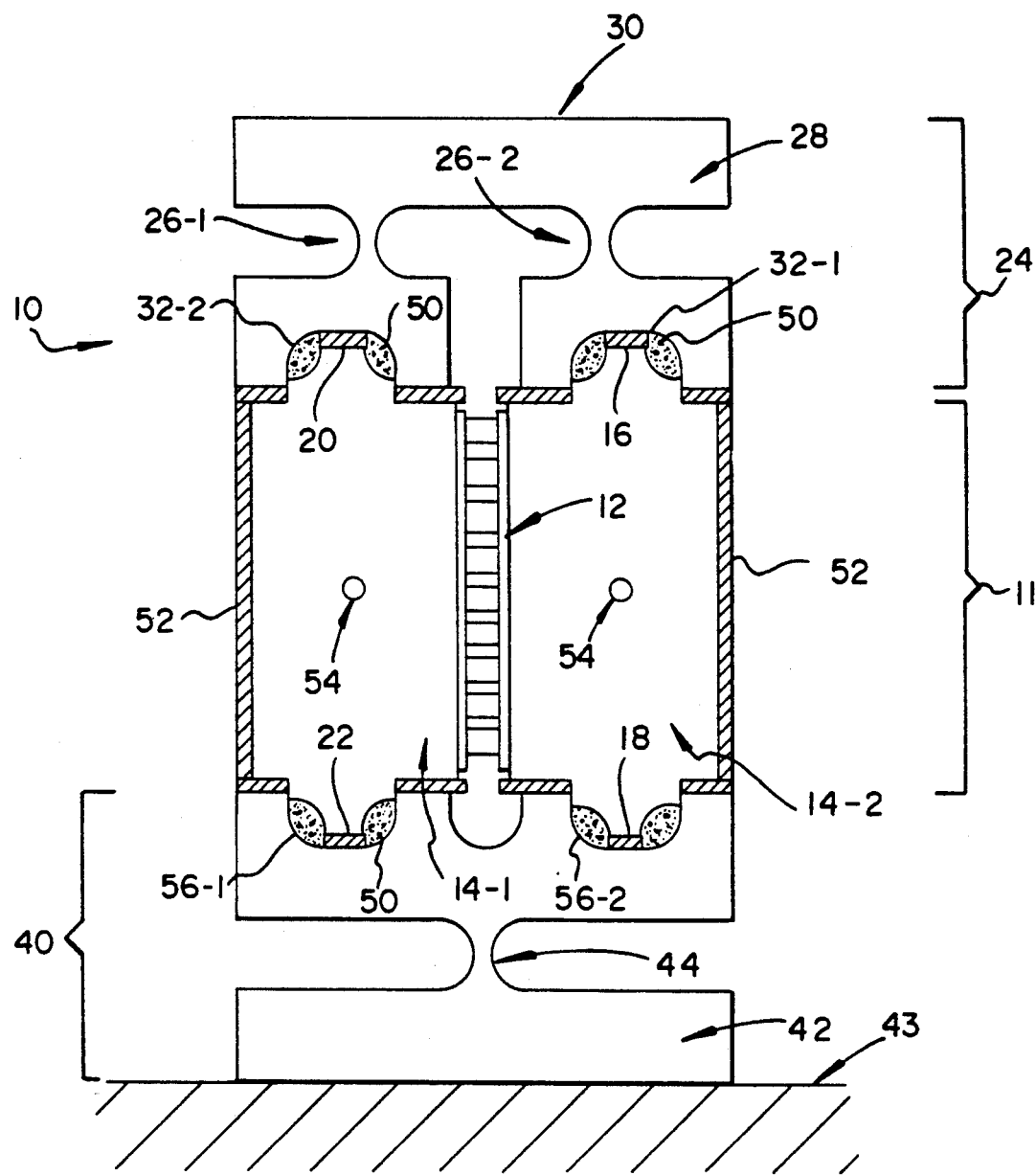
FIG. 1 is a simplified side sectional view of a thermally-controlled rotary displacement actuator constructed according to the present invention for precise positioning of a moveable element in an optical or mechanical system.

Preferred embodiments of the present invention will now be described with reference to the accompanying drawings, wherein like reference numerals refer to like components.

With reference to FIGS. 1-3, a first preferred embodiment 10 of the invention includes a thermally-controlled rotary displacement actuator capable of precise positioning of a moveable object over a limited angle. The rotary displacement actuator 10 includes an actuator body 11 having a thermal element, preferably in the form of a thermoelectric cooling element (TEC) module 12 located between first and second linear actuator elements 14-1, 14-2, to effect a temperature difference between the linear actuator elements. The thermal element 12 transfers heat from actuator element 14-2 to actuator element 14-1, thereby creating a temperature difference between the actuator elements. The length L of each linear actuator element is defined by its upper and lower ends 16, 18 and 20, 22. Due to the coefficient of thermal expansion (CTE) of the linear actuator elements 14-1, 14-2, the thermal energy transferred by the thermal element 12 from one linear actuator element to the other causes a differential H in the lengths $L_1$, $L_2$ of the linear actuator elements, which accordingly causes a rotation of an attached upper yoke 24.

The upper yoke 24 preferably includes first and second upper yoke flexures 26-1, 26-2 to apply a moment (torque) output to the moveable element. The first and second upper yoke flexures allow the linear actuator elements to remain parallel during their expansion or contraction. The upper yoke 24 also includes a mounting bar 28 to provide an attachment surface 30 for the moveable object 31 (shown in FIG. 3) to receive the output of the rotary displacement actuator. Linear actuator element seats 32-1, 32-2 receive the upper ends of the linear actuator elements 14-1, 14-2.

The thermal rotary actuator further includes a lower yoke 40 which includes a mounting base 42, a lower yoke flexure 44, and a seat portion having seats 56-1, 56-2 for the two linear actuator elements. The lower yoke flexure 44 is preferably a single flexure, and thus the lower yoke connects to the mounting base 42 to support the actuator 10 and to connect the lower ends 18, 22 of the linear actuator elements to the mounting base. The flexure allows the body of the actuator 10 to pivot to accommodate kinematic changes during operation. As further illustrated in FIG. 3, the upper 28 and lower 42 yokes provide a means of attaching the thermal rotary actuator 10 between a reaction structure 43 and the moveable object 31. The single flexure 44 in the lower yoke allows the actuator body 11 to tilt when the upper yoke 24 is constrained by the moveable element 31. Alternatively, the thermal rotary actuator 10 may be modified to perform as a supporting structural component if the single lower yoke flexure 44 can be omitted. An example of such use would be as a single point mount for a mechanical or optical element steering mirror.

The linear actuator elements 14-1, 14-2 are insulated from the upper and lower yokes by an insulating adhesive compound 50 to minimize heat loss from the linear actuator elements. Preferably the insulating adhesive compound is an epoxy or epoxy/glass adhesive material having nearly the same CTE as the linear actuator elements and yoke. An epoxy-based adhesive, for example, may be used to bond the linear actuator elements into the mounting cavities. Also provided is an epoxy/glass enclosure 52 that insulates the sides of the linear actuator elements. These measures are intended to minimize the heat transfer between the linear actuator elements and their surrounding structure (excepting the TEC module 12), thereby minimizing the heat load on the TEC module 12. The contact resistance at the TEC module/linear actuator element interfaces is preferably reduced by use of heat conductive paste at the interfaces. Because commercially-available embodiments of the TEC module have thickness variations of up to 0.005", each thermal rotary actuator 10 is assembled with a preload on the linear actuator elements to insure intimate contact of each linear actuator element with the TEC module.

The TEC module 12 is restrained by appropriate means such as protrusions (not shown) at the upper and lower ends of the linear actuator elements and the enclosure 52. This arrangement allows the TEC module 12 to remain in contact with the linear actuator elements 14-1, 14-2 while allowing the linear actuator element side walls to expand or contract against the TEC module, thereby preventing any loss of motion that would occur if the TEC module were otherwise fixed to the linear actuator elements.

A preferred embodiment of the thermoelectric cooler (TEC) module 12 is commercially available as the Marlow Industries Model SP1547T. Such a TEC module has been found to provide a 40 degrees centigrade temperature differential with only 2 Watts of input power. This module, when combined with 1.0" linear actuator elements, has been found to provide a total of 700 microinches of differential length change H.

Since the thermal rotary actuator 10 operates by differential thermal expansion of the linear actuator elements 14-1, 14-2, the important design parameters are the coefficient of thermal expansion (CTE) of the linear actuator elements and the maximum temperature differential maintained in the linear actuator elements by the TEC for a given heat load. To maximize the output rotation of the mounting bar 28 for a given element length, high CTE materials such as copper (CTE=17 microinches/inch/C) or aluminum (CTE=23 microinches/inch/C) are used. Feedback control of the TEC module 12 selects the temperature differential between the linear actuator elements by use of appropriate control electronics (not shown) that receive signals from a thermistor 54 placed in a small well near the center of each linear actuator element.

With particular reference to FIG. 3, one may appreciate that upper yoke is provided with the two independent flexures 26-1, 26-2 to locate the center of rotation of the mounting bar 28. Since the temperatures T1 and T2 of the elements may be set by the TEC module 12 to predetermined levels respectively above and below ambient temperature, one element expands while the other contracts. (In FIG. 3, element 14-1 is shown expanded while while element 14-2 is contracted; the reverse may be implemented according to the selection of T1 and T2 or by the selection of the CTE values.) This length differential H confines the center of rotation A of the actuator 10 to the actuator center line CL. The two upper yoke flexures 26-1, 26-2 thereby couple the mounting bar 28 to the linear actuator elements and define the vertical position of the center of rotation A. By coupling the moveable object to the mounting bar, one advantageously obtains a pure rotary displacement of the moveable object about the center of rotation A.

The width of the linear actuator elements is preferably chosen such that the torque that they generate does not produce significant actuator element compression. The upper yoke flexures are preferably sized to carry the required vertical loads without buckling, and to have a bending stiffness of 5 to 20 times lower than other sections.

The length L and the maximum TEC temperature differential $T_1 - T_2$ will determine the largest deflection of the upper yoke flexures and hence the maximum angle $\theta$ of the mounting bar at the output. An active length C is determined by the locations of the flexure centers. The effective actuator lever arm A' is defined as the distance from the actuator center line CL to the center of one of the upper yoke flexures. Mounting bar angle $\theta$ is inversely proportional to A'. Horizontal displacement W of the mounting bar is directly proportional to B, (the distance from the top of the upper yoke to the center of rotation A) and is defined as the distance from the top 30 of the mounting bar to the center of rotation A.

Operation of the actuator 10 is illustrated in FIG. 3. A vertical displacement VD of a moveable element 50

(illustrated as being along the Y axis) is achieved by biasing the TEC module 12 such that the first linear actuator element 14-1 is at a higher temperature than the second linear actuator element 14-2, creating a length differential H. Since the elements are coupled via the upper yoke flexures 26-1, 26-2 to the upper mounting bar 28, a rotation according to angle $\theta$ will result. The vertical displacement VD is then proportional to the ratio of the mounting bar effective length D, to the actuator moment arm A'. The differential length H and the vertical displacement VD can be expressed as:

$$H = (T1 - T2)(L)$$

$$VD = (H)(CTE)(D/A)$$

The lateral movement W is:

$$W = (H)(CTE)(B/A)$$

The angle $\theta$ about the center of rotation A is:

$$\theta = \arcsin(H/A).$$

Figure 4:
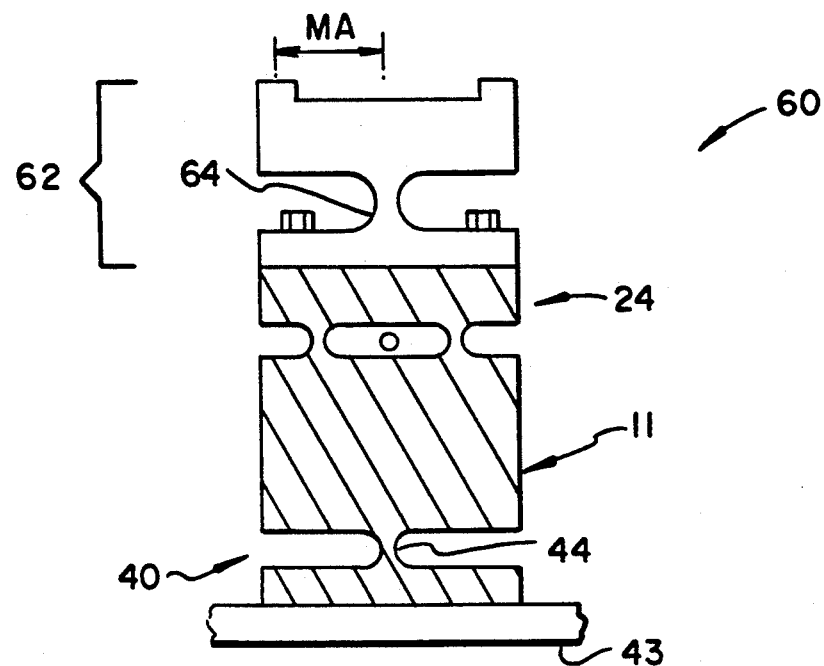
Figure 5:
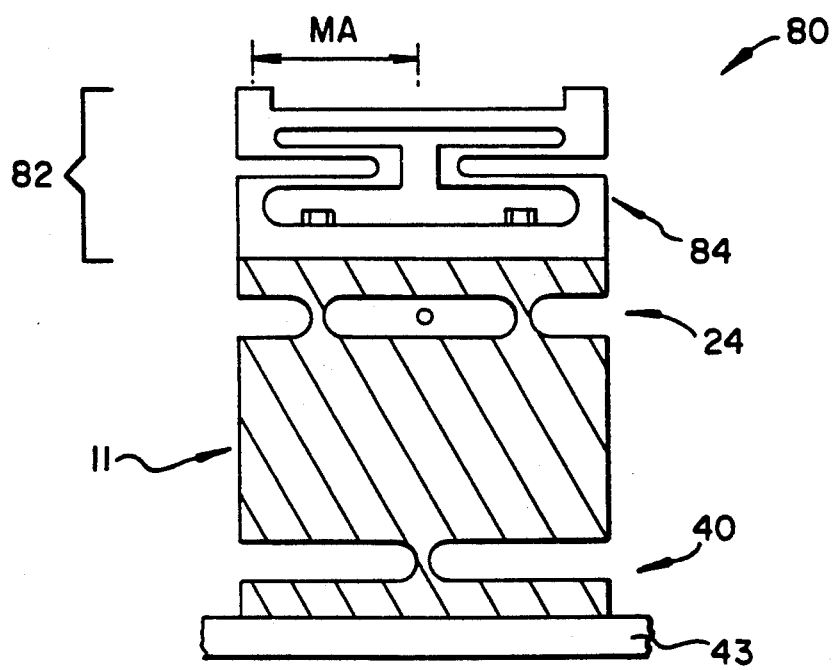

As shown in FIGS. 4–5, second and third preferred embodiments 60, 80 of the thermal rotary actuator may be constructed to provide a controlled torque by adding an auxiliary flexure system 62, 82 to the upper mounting bar 28. In both the second 60 and third 80 illustrated embodiments, the vertical displacement VD is converted to a torque via the auxiliary flexures 64 or 84. The applied moment M is proportional to the ratio of the actuator moment arm A' to the flexure moment arm MA multiplied by the auxiliary flexure stiffness K and the element deflection H. The applied moment M is then calculated as:

$$M = K(H)(A'/MA).$$

FIG. 4 illustrates a single, thick auxiliary flexure 64 for use in, for example, a system requiring large moments of displacement. The stiffness of the auxiliary flexure 64 should be at least 4 times, and preferably 10 times, greater than the stiffness of the lower yoke flexure 44. FIG. 5 illustrates a third preferred embodiment 80 that employs an auxiliary flexure system 82 in the form of one or more fold back flexures 84. The fold-back construction of the auxiliary flexure system 82 is preferred for its very low spring constant, thus allowing the generation of precise, low-magnitude moments.

Use of one of the illustrated preferred embodiments to achieve alignment of a system of moveable optical or mechanical elements, or the like, has several advantages. First, the convenience of effecting displacement or adjustment by remote control of the TEC module eliminates the need to fully disassemble the optical or mechanical system to obtain the desired adjustment. If the temperature control includes feedback from a beam focus or alignment sensor, a closed loop "on the fly" beam positioning system can be developed. Similarly, accurate displacement of a light beam while compensating for changes in ambient temperature, humidity, or other variation of other system parameters, can be accomplished by feedback from other appropriate sensors. Accordingly, compensation for perturbations and non-linearities that are external to the thermal rotary actuator are easily implemented electronically. The range, resolution, and accuracy of the thermal rotary actuator can be optimized using simple geometric changes to its structure. Extremely accurate rotary displacements may be achieved by proper selection of actuator geometry.

Furthermore, an actuator constructed according to the present invention may be used as either a rotary or torque actuator by changing the construction of the upper yoke 24 and mounting bar 28. The actuator can be made free-standing and is capable of supporting large vertical loads. The contemplated actuator has a very large torque capability that is limited only by the actuation element and yoke stiffness. Because the actuator effects displacement along the center line of the device, conventional geometric compensation is unnecessary. Finally, the actuator is relatively simple to construct and has no sliding or frictionally-engaged parts, and thus is capable of operating with an inherently high reliability over a long life.

The invention has been described in detail with particular reference to the preferred embodiments thereof, but it will be understood that variations and modifications can be effected within the spirit and scope of the invention. For example, it can be seen that the ultimate resolution of a thermal rotary actuator constructed according to the present invention will be a function of how accurately the temperature differential is established between the linear actuator elements 14-1, 14-2. The sensitivity of the thermal rotary actuator to inaccuracies in the temperature control provided by the TEC module may accordingly be compensated in part by careful design of the actuator geometry. In addition, one skilled in the art will appreciate that the basic geometry of the illustrated embodiments of the thermal rotary actuator may be modified to achieve differing displacement accuracies and rotational ranges.

What is claimed is:

1. A thermal rotary actuator for precise displacement of a moveable element, such as an optical or mechanical element or the like, with respect to a reaction structure, comprising:

an actuator body including: a) first and second spaced linear actuator elements, each linear actuator element having a respective predetermined coefficient of thermal expansion (CTE) and respective first and second ends defining the linear actuator element length, said linear actuator elements, in response to a temperature differential therebetween, being thereby subject to a predetermined length differential, and b) means for effecting the selected temperature differential in the first and second linear actuator elements to achieve the predetermined length differential;

first yoke means for receiving the first ends of the first and second linear actuator elements, including fixing means for fixing the first ends in a predetermined spatial relationship and means for flexibly attaching said first ends to the reaction structure;

second yoke means for receiving the second ends of the first and second linear actuator elements and for flexibly attaching the moveable element to the second ends of the first and second linear actuator elements, to thereby translate the predetermined length differential to a proportional displacement of the moveable element; and means for thermally insulating the first and second linear actuator elements from the remainder of the actuator body and the first and second yoke means.

2. The thermal rotary actuator of claim 1, further comprising an auxiliary flexure extending between the second yoke means and the moveable element.

3. The thermal rotary actuator of claim 2, wherein said auxiliary flexure exhibits a flexure stiffness of at least 4 times the flexure stiffness of said means for flexibly attaching said first ends to the reaction structure.

4. The thermal rotary actuator of claim 2, wherein the auxiliary flexure is provided in the form of a single flexure.

5. The thermal rotary actuator of claim 2, wherein the auxiliary flexure is provided in the form of a plurality of fold back flexures.

* * * * *